United States Patent
Wang et al.

(10) Patent No.: US 12,281,038 B2
(45) Date of Patent: Apr. 22, 2025

(54) HOT-STATE EFFICIENT FILLING DEVICES AND METHODS FOR ROOTS OF FLANGES OF CLARIFICATION SECTIONS OF PLATINUM CHANNELS

(71) Applicant: CAIHONG DISPLAY DEVICES CO., LTD., Shaanxi (CN)

(72) Inventors: Menglong Wang, Xianyang (CN); Wei Yang, Xianyang (CN); Chao Yu, Xianyang (CN)

(73) Assignee: CAIHONG DISPLAY DEVICES CO., LTD., Xianyang (CN)

( * ) Notice: Subject to any disclaimer, the term of this patent is extended or adjusted under 35 U.S.C. 154(b) by 0 days.

(21) Appl. No.: 18/969,219

(22) Filed: Dec. 4, 2024

(65) Prior Publication Data

US 2025/0091928 A1 Mar. 20, 2025

Related U.S. Application Data

(63) Continuation-in-part of application No. PCT/CN2024/092916, filed on May 13, 2024.

(30) Foreign Application Priority Data

Jun. 19, 2023 (CN) .......................... 202310729308.9

(51) Int. Cl.
*C03B 7/06* (2006.01)
(52) U.S. Cl.
CPC ..................... *C03B 7/06* (2013.01)

(58) Field of Classification Search
CPC ........................................................ C03B 7/06
(Continued)

(56) References Cited

FOREIGN PATENT DOCUMENTS

| CN | 114516716 A | 5/2022 |
|---|---|---|
| CN | 114917806 A | 8/2022 |

(Continued)

OTHER PUBLICATIONS

Cn116750954 (Year: 2023).*

(Continued)

*Primary Examiner* — Gene O Crawford
*Assistant Examiner* — Lester Ill Rushin
(74) *Attorney, Agent, or Firm* — PORUS IP LLC

(57) ABSTRACT

Disclosed is a hot-state efficient filling device and method for a root of a flange of a clarification section of a platinum channel, comprising a material conveying structure. A refractory brick channel is provided outside the clarification section of the platinum channel, the clarification section of the platinum channel includes a platinum body and the flange, a cavity region is provided between the flange and the refractory brick channel, one or more filling observation openings are formed on the refractory brick channel corresponding to the cavity region, a transmission end of the flange penetrates through the one or more filling observation openings, the material conveying structure penetrates through the one or more filling observation openings, an input end of the material conveying structure is provided outside the refractory brick channel, and a reserved distance is arranged between the output end of the material conveying structure and the platinum body.

10 Claims, 8 Drawing Sheets

(58) Field of Classification Search
USPC .......................................................... 193/34
See application file for complete search history.

(56) References Cited

FOREIGN PATENT DOCUMENTS

| | | |
|---|---|---|
| CN | 217829767 U | 11/2022 |
| CN | 116750954 A | 9/2023 |
| GB | 1416027 A | 12/1975 |
| JP | 2015105204 A | 6/2015 |

OTHER PUBLICATIONS

CN119219312 (Year: 2023).*
JP2018516837 (Year: 2018).*
International Search Report in PCT/CN2024/092916 mailed on Aug. 30, 2024, 7 pages.
Written Opinion in PCT/CN2024/092916 mailed on Aug. 30, 2024, 9 pages.

* cited by examiner

200

300

HOT-STATE EFFICIENT FILLING DEVICES AND METHODS FOR ROOTS OF FLANGES OF CLARIFICATION SECTIONS OF PLATINUM CHANNELS

CROSS-REFERENCE TO RELATED APPLICATIONS

The present disclosure is a continuation-in-part of international application No. PCT/CN2024/092916, filed on May 13, 2024, which claims priority to Chinese patent application No. 202310729308.9, filed on Jun. 19, 2023, the entire contents of each of which are incorporated herein by reference.

TECHNICAL FIELD

The present disclosure relates to the technical field of substrate glass manufacturing, and in particular, to a hot-state efficient filling device and method for a root of a flange of a clarification section of a platinum channel.

BACKGROUND

The platinum channel, as a core piece of equipment in the substrate glass manufacturing process, needs phased protection combined with the operation scenarios at different stages and the final operation requirements, whether from the aspects of design and manufacturing, or from the aspects of masonry installation and management of heating and expansion. The clarification section is a component in the platinum channel that operates at the highest temperature and is most susceptible to damage. Although the platinum channel is mainly made from platinum-rhodium alloy, which offers excellent high-temperature and corrosion resistance, prolonged operation at temperatures above 1400° C., as well as continuous scouring and erosion from the internal molten glass still bring a significant challenge to the platinum channel.

During the initial installation of the platinum channel, most regions of the clarification section can be sealed at room temperature. The sealing manner mainly involves filling the space between the outside of the platinum and the refractory brick with high-temperature resistant zirconia-based powder. However, for the flange of the platinum channel, due to the relative expansion displacement between the platinum and the refractory brick channel during the actual heating process, and the dimension of the flange being larger than that of the refractory brick, it is necessary to leave space in advance for the flange of the clarification section. After the heating and expansion are completed, a rapid high-temperature filling is performed to ensure the final sealing effect at the root of the flange.

Based on years of analysis, the main issue restricting the lifespan of the platinum channel is the root of the flange of the clarification section. Although the root is ultimately filled in a hot state, the harsh operating environment, confined space, and stringent technical requirements for operators in the hot state make the filling of the root different from that of a main section of the clarification section filled at room temperature. According to a comprehensive analysis, it was found that the densification of the hot-state filling for the root of the flange only reaches about 70% of the densification of the main section. Therefore, in actual production, after the platinum channel has been in operation for over two years, localized cracks may first appear at the root of the flange. This is mainly caused by oxidation at high temperatures, leading to the volatilization of the base material at the root, which results in significant thinning of the wall of the platinum channel. As the deterioration progresses, the platinum channel may eventually break at the root, which is not only due to the thinning of the wall, but also accelerated by localized Joule heating caused by the running current.

In summary, for the sealing and filling of the root of the flange of the clarification section, a more convenient auxiliary method needs to be considered. The current filling method mainly uses multiple groups of personnel to synchronously fill the root from different angles using simple tools such as iron shovels. This method is inefficient and has a poor filling effect. In addition, since the filling process requires the temporary removal of the thermal insulation cotton in the root, the platinum is exposed, the longer such exposure lasts, the greater the temperature difference, which may have a negative impact on the subsequent heating trial production. Therefore, improving the filling efficiency has become the main goal for the root.

Accordingly, it is desired to provide a hot-state efficient filling device and method for a root of a flange of a clarification section of a platinum channel, in order to solve the problem of a long operation time for sealing and filling of the root of the flange of the clarification section of the platinum channel.

SUMMARY

The purpose of the present disclosure is to address the issue of prolonged operation time in sealing and filling a root of a flange in a clarification section of a platinum channel. The present disclosure provides a hot-state efficient filling device and method for a root of a flange of a clarification section of a platinum channel, thereby effectively enhancing a densification of the hot-state filling of the root of the flange.

In order to achieve the above purpose, the present disclosure adopts following technical solutions.

A hot-state efficient filling device for a root of a flange of a clarification section of a platinum channel is provided, comprising a material conveying structure. A refractory brick channel is provided outside the clarification section of the platinum channel. The clarification section of the platinum channel includes a platinum body and the flange. A cavity region is provided between the flange and the refractory brick channel and used for normal expansion of the flange in a heating process. One or more filling observation openings are formed on the refractory brick channel corresponding to the cavity region. A transmission end of the flange penetrates through the one or more filling observation openings. The material conveying structure penetrates through the one or more filling observation openings. An output end of the material conveying structure is provided in the cavity region, an input end of the material conveying structure is provided outside the refractory brick channel, and a reserved distance is arranged between the output end of the material conveying structure and the platinum body.

In some embodiments, the material conveying structure includes two side material conveying structures, and the two side material conveying structures are symmetrically provided on two sides of the platinum channel.

Further, each of the two side material conveying structures includes a side material conveying trough, a side material conveying pipe, a side material conveying nozzle, and a side material conveying support frame. The side material conveying trough has a hopper structure with a large top and a small bottom, an inclined angle of the hopper structure is within a range of 75° to 80°. Each of an outside of the side material conveying trough and an outside of the side material conveying pipe is welded with a connection lug. The side material conveying support frame includes a side long leg portion and a side short leg portion. The side short leg portion is provided outside the refractory brick channel and close to the side material conveying nozzle, and the side long leg portion is provided outside the refractory brick channel and away from the side material conveying nozzle. An upper portion of the side material conveying support frame is connected to the connection lugs through bolts, and a bottom portion of the side material conveying support frame is welded with side support feet.

In some embodiments, the side support feet are circular. The side material conveying pipe and the side material conveying nozzle are provided as oblique multi-angle splicing pipes or multi-section pipes with oblique multi-curvature splicing arcs. Cross-sectional shapes of the side material conveying pipe and the side material conveying nozzle both are rounded rectangular or elliptical. The cross-sectional shapes are perpendicular to a flowing direction of a filling material, and an outlet end of the side material conveying nozzle has a diagonal slit shape or rectangular shape.

In some embodiments, the material conveying structure further includes a top material conveying structure. The one or more filling observation openings include two side openings and a top opening. The two side material conveying structures penetrate through the two side openings, respectively. The top material conveying structure penetrates through the top opening, and the transmission end of the flange penetrates through the top opening.

In some embodiments, the top material conveying structure includes a top material conveying trough, a top material conveying pipe, a top material conveying nozzle, and a top material conveying support frame. The top material conveying trough has a hopper structure with a large top and a small bottom. Each of the top material conveying trough and the top material conveying pipe is welded with a connection lug. The top material conveying support frame includes a top long leg portion and a top short leg portion. The top short leg portion is provided outside the refractory brick channel and close to the top material conveying nozzle, and the top long leg portion is provided outside the refractory brick channel and away from the top material conveying nozzle. An upper portion of the top material conveying support frame is connected to the connection lugs through bolts, and a bottom portion of the top material conveying support frame is welded with top support feet.

In some embodiments, the top support feet are circular. The top material conveying pipe and the top material conveying nozzle are provided as straight pipes or segmented multi-angle splicing pipes. Cross-sectional shapes of the top material conveying pipe and the top material conveying nozzle both are rounded rectangular or oval. The cross-sectional shapes are perpendicular to a flowing direction of a filling material. An outlet end of the top material conveying nozzle has a diagonal slit shape or rectangular shape.

In some embodiments, a cross-sectional width of the top material conveying pipe is equal to a cross-sectional width of the side material conveying pipe. A cross-sectional length of the top material conveying pipe is greater than a cross-sectional length of the side material conveying pipe. An inclined angle of the top material conveying pipe is greater than an inclined angle of the side material conveying pipe. A volume of the top material conveying trough is greater than a volume of the side material conveying trough.

In some embodiments, a filling layer is provided between the platinum body and the refractory brick channel, the material conveying structure is made of stainless steel, and the stainless steel has a carbon content of less than 0.08%.

A hot-state efficient filling method for a root of a flange of a clarification section of a platinum channel is provided, which utilizes the hot-state efficient filling device for a root of a flange of a clarification section of a platinum channel, comprising: temporarily sealing the cavity region between the flange and the refractory brick channel with a high-temperature cotton in the heating process, and when expansion of the clarification section of the platinum channel reaches an expected level, removing the cotton in the cavity region, inserting the material conveying structure through one or more filling observation openings into the root of the flange of the clarification section of the platinum channel, and setting the reserved distance between the output end of the material conveying structure and the platinum body; and pouring a filling material into the input end of the material conveying structure such that the filling material flows through the material conveying structure into the root of the flange of the clarification section of the platinum channel, while observing a filling situation of the filling material through the one or more filling observation openings to complete a hot-state efficient filling of the root of the flange of the clarification section of the platinum channel.

BRIEF DESCRIPTION OF THE DRAWINGS

The accompanying drawings of the present disclosure are used to provide a further understanding of the present disclosure and form a part of the invention, and the schematic embodiments of the invention and the description thereof are used for the purpose of explaining the present disclosure, and do not constitute an undue limitation of the present disclosure.

Labels in the figures denote: 1, platinum body; 2, flange; 3, filling layer; 4, refractory brick channel; 5, side opening; 6, top opening; 7, side material conveying structure; 8, top material conveying structure; 7-1, side material conveying trough; 7-2, side material conveying pipe; 7-3, side material conveying nozzle; 7-4, side material conveying support frame; 7-5, side support feet, 8-1, top material conveying trough; 8-2, top material conveying pipe; 8-3, top material conveying nozzle; 8-4, top material conveying support frame; 9, loading device; 9-1, material bin; 9-11, first discharge port, 9-12, second discharge port, 9-13, third discharge port, 9-2, moving track; 9-3, lifting device.

DETAILED DESCRIPTION

In order to enable those in the art to better understand the technical embodiments of the present disclosure, the technical embodiments in the embodiments of the present disclosure will be clearly and completely described below in conjunction with the accompanying drawings in the embodiments of the present disclosure, and it is clear that the described embodiments are only a part of the embodiments of the present disclosure, and not all of the embodiments. Based on the embodiments in the present disclosure, all other embodiments obtained by a person of ordinary skill in the art without making creative labor should fall within the scope of protection of the present disclosure.

It should be noted that the terms "first," "second," etc., in the present disclosure and the claims and the accompanying drawings described above are used to distinguish similar objects and need not be used to describe a particular order or sequence. It should be understood that the data so used may be interchangeable, where appropriate, so that the embodiments of the present disclosure described herein can be carried out in an order other than those illustrated or described herein. Additionally, the terms "comprising" and "including," and any variations thereof, are intended to cover non-exclusive embodiments, e.g., a process, method, system, product, or apparatus that includes a series of steps or units need not be limited to those that are clearly listed, but may include other steps or units that are not clearly listed or are inherent to the process, method, product, or apparatus.

Figure 1:
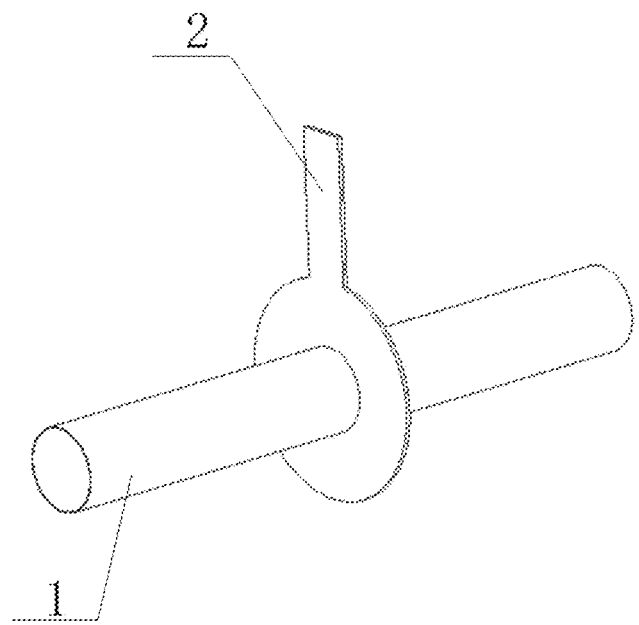
FIG. 1 is a schematic diagram illustrating an exemplary structure of a flange of a clarification section of a platinum channel according to some embodiments of the present disclosure.

FIG. 1 is a schematic diagram illustrating an exemplary structure of a flange of a clarification section of a platinum channel according to some embodiments of the present disclosure.

The platinum channel is a structure used to clarify and homogenize glass liquid at high temperatures during glass manufacturing. The clarification section of the platinum channel is a main part for clarifying the glass liquid in the platinum channel, and is configured to clarify and defoam preliminary-molten glass liquid at high temperatures and purify the glass liquid.

As shown in FIG. 1, the clarification section of the platinum channel is a structure commonly used in the art for clarifying and defoaming the preliminary-molten glass liquid from a pool furnace at high temperatures and to purify the glass liquid.

In some embodiments, a structure of the clarification section of the platinum channel includes a platinum body 1 and a flange 2.

The platinum body 1 is a core part of the clarification section of the platinum channel, and is configured to clarify and homogenize the glass liquid at high temperatures to ensure the quality and performance of the glass liquid. The platinum body 1 is typically made of a high-purity platinum material and may include at least one section of platinum pipe.

The flange 2 is a structure connecting the at least one section of platinum pipe in the clarification section of the platinum channel, and is made of a heat-resistant and corrosion-resistant material such as stainless steel or a special alloy. The flange 2 is secured to two ends of the platinum pipe by welding.

In some embodiments, flanges 2 on two adjacent sections of platinum pipes are connected together by welding or through bolts, so that a plurality of platinum pipes are connected to form the platinum body 1.

In some embodiments, the flange 2 has a transmission end. The transmission end extends outwardly along a radius of the flange for transmitting a current from an external power system.

In some embodiments, the flange 2 is further configured to transmit the current to ensure heat of the platinum body 1. For example, two flanges 2 may form a loop that converts the current from the external power system into the Joule heat of the platinum body 1, so to heat the glass liquid inside the clarification section of the platinum channel.

In some embodiments, the clarification section of the platinum channel may have other possible structures.

Figure 2:
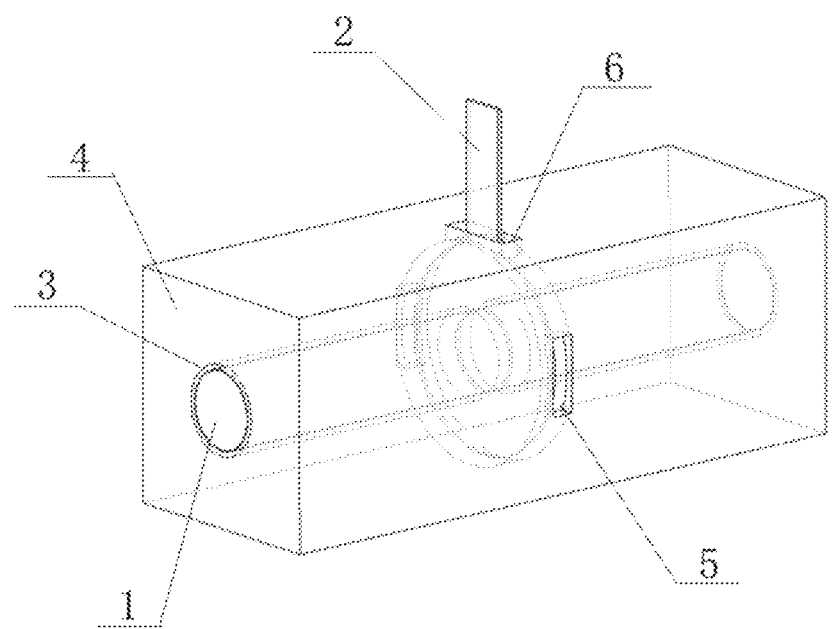
FIG. 2 is a schematic diagram illustrating an overall view of a refractory brick in a flange of a clarification section of a platinum channel according to some embodiments of the present disclosure.

FIG. 2 is a schematic diagram illustrating an overall view of a refractory brick in a flange of a clarification section of a platinum channel according to some embodiments of the present disclosure.

As shown in FIG. 2, in some embodiments, a refractory structure is wrapped around the outside of the clarification section of the platinum channel, and the refractory structure is a refractory brick. By providing at least one layer of refractory structure, a refractory brick channel 4 is formed on the outside of the clarification section of the platinum channel.

In some embodiments, a filling layer 3 is provided between the platinum body 1 and the refractory brick channel 4. The filling layer 3 is a normal filling at a room temperature.

The clarification section of the platinum channel usually processes glass liquid at high temperatures, and the flange 2 may expand due to being heated. In some embodiments, to guarantee that the flange 2 has sufficient expansion space during a heating process of the clarification section of the platinum channel, a cavity region with a certain length is reserved inside the refractory brick channel 4. After the heating process of the clarification section of the platinum channel is completed and the flange 2 does not continue to expand, the cavity region is then filled to ensure the sealing effect of a root of the flange 2. The root of the flange 2 refers to a region that is near a connection between the platinum pipe.

In some embodiments, one or more filling observation openings are provided on the outside of the refractory brick channel 4, for the cavity region around the flange 2. For example, the one or more filling observation openings include a side opening 5 and a top opening 6, the side opening 5 being provided at a side portion of the refractory brick channel 4, and the top opening 6 being provided at a top portion of the refractory brick channel 4. The top opening 6 is penetrated by a transmission end of the flange 2.

Typically, when filling the cavity region, a filling material is manually poured directly, which requires operators to work close to the clarification section of the platinum channel at high temperatures, resulting in a harsh working environment. Due to limitations imposed by the operators themselves, an amount of filling material poured in a single attempt is limited, which requires a prolonged period to complete a filling process. During this time, the temperature of the clarification section of the platinum channel decreases, causing the expansion of the flange to reduce, which adversely affects a filling effect.

Some embodiments of the present disclosure provide a hot-state efficient filling device for a root of a flange of a clarification section of a platinum channel, (hereinafter referred to as a "filling device") to optimize a filling process and to better ensure the filling effect.

The filling device may include a material conveying structure. The material conveying structure is a device configured to convey the filling material to the cavity region between the flange 2 and the refractory brick channel 4. The material conveying structure may penetrate through the one or more filling observation openings. The material conveying structure includes an input end and an output end, the input end of the material conveying structure being provided outside of the refractory brick channel 4, the output end being connected to the cavity region, and a reserved distance is arranged between the output end and the platinum body 1.

When filling the cavity region using the filling device, the operator may pour a large amount of filling material into the input end of the material conveying structure in advance, and the filling material flows into the root of the flange of the clarification section of the platinum channel through the output end of the material conveying structure. The operator may observe a filling situation through the one or more filling observation openings and complete a hot-state efficient filling of the root of the flange of the clarification section of the platinum channel.

In some embodiments of the present disclosure, the material conveying structure penetrates through the one or more filling observation openings, with the output end positioned in the cavity region and the input end located outside the refractory brick channel. Such configuration transforms direct filling into a simplified external loading process, enabling rapid filling and providing an effective time advantage for maintaining thermal insulation of the root of the flange of the clarification section of the platinum channel, thereby effectively improving the densification of hot-state filling at the root of the flange, reducing an operation time and saving costs, and offering significant practical value.

Figure 3:
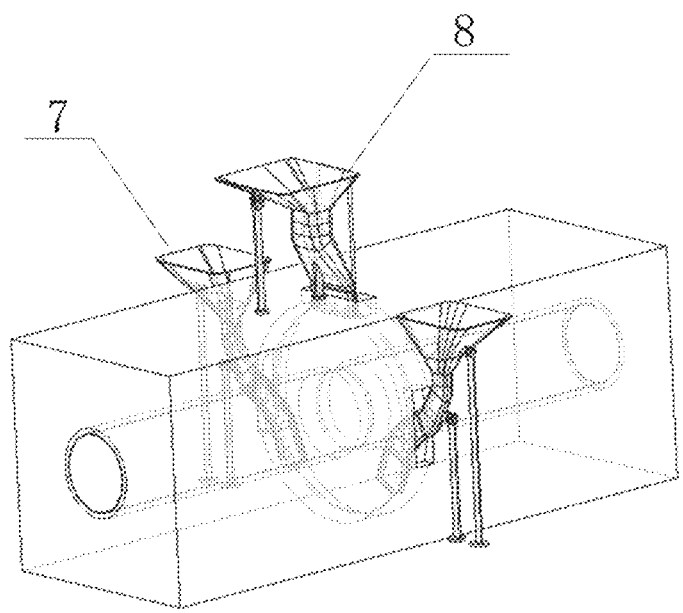
FIG. 3 is a schematic diagram illustrating a layout of a filling in a flange of a clarification section of a platinum channel according to some embodiments of the present disclosure.

FIG. 3 is a schematic diagram illustrating an exemplary layout of a filling structure of a flange of a clarification section of a platinum channel according to some embodiments of the present disclosure.

In some embodiments, a material conveying structure includes a side material conveying structure 7.

In some embodiments, the material conveying structure includes the side material conveying structure 7 and a top material conveying structure 8.

In some embodiments, the material conveying structure includes two side material conveying structures 7. The two side material conveying structures 7 may be symmetrically distributed on two sides of the refractory brick channel 4. In some embodiments, the material conveying structure includes One top material conveying structure 8. The top material conveying structure 8 may be disposed on an upper portion of the refractory brick channel 4.

In some embodiments, the two side material conveying structures 7 may be mounted at the two side openings 5 through a fixed bracket, respectively. The top material conveying structure 8 may be mounted at the top opening 6 through a fixed bracket. As shown in FIG. 3, the side material feeding structures 7 penetrate through the two side openings 5 and the top material conveying structure 8 penetrates through the top opening 6.

The side material conveying structures and the top material conveying structure realize dead-zone-free filling of the cavity region inside the clarification section of the platinum channel.

In some embodiments, the material conveying structure is made entirely of stainless steel, which has a carbon content of less than 0.08%, so as to reduce contamination of the platinum body inside by metal tools and avoid carbonization reactions at high temperatures.

Figure 4:
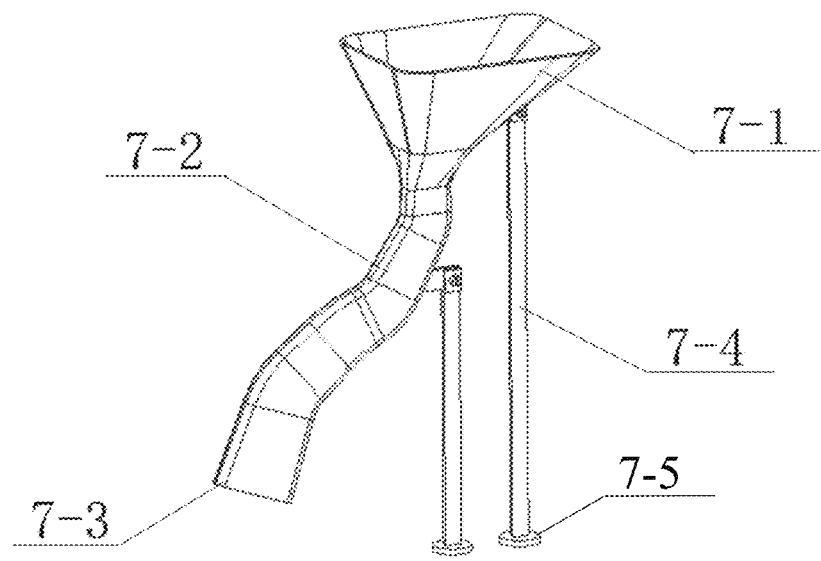
FIG. 4 is a schematic diagram illustrating an exemplary structure of a side material conveying trough according to some embodiments of the present disclosure.
Figure 5:
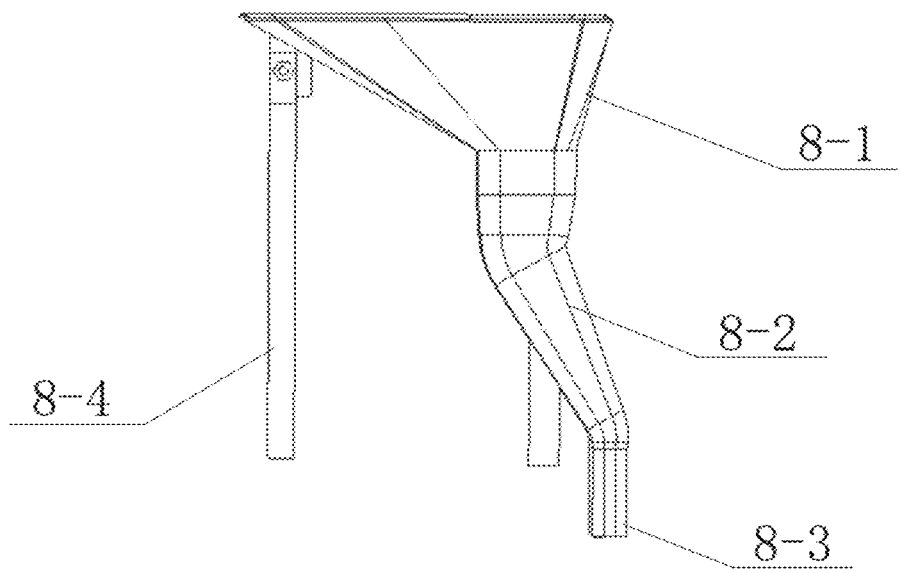
FIG. 5 is a schematic diagram illustrating an exemplary structure of a top filling material conveying trough according to some embodiments of the present disclosure.

Detailed descriptions of the side material conveying structure and the top material conveying structure can be found in FIG. 4, FIG. 5, and the related descriptions thereof in the present disclosure.

FIG. 4 is a schematic diagram illustrating an exemplary structure of a side material conveying trough according to some embodiments of the present disclosure.

The side material conveying structure 7 is configured to feed filling material into an inner cavity at a root of a flange through the side opening 5 of the refractory brick channel 4.

As shown in FIG. 4, the side material conveying structure 7 includes a side material conveying trough 7-1, a side material conveying pipe 7-2, a side material conveying nozzle 7-3, and a side material conveying support frame 7-4.

The side material conveying trough 7-1 is configured to accommodate the filling material poured into the side material conveying structure 7 and to initially guide a filling material to flow downward.

In some embodiments, the side material conveying trough 7-1 has a hopper structure with a large top and a small bottom, which enables the filling material to slide into the side material conveying pipe 7-2. The hopper structure of the side material conveying trough 7-1 has an inclined angle within a range of 75° to 80° to ensure a normal flow of the filling material without causing material piling, and the inclined angle of less than 80° avoids the problem of dusting of the filling material.

In some embodiments, a capacity volume of the side material conveying trough 7-1 is determined based on a loading personnel's single-person carrying capacity and a compaction density of the filling material. For example, the capacity volume of the side material conveying trough 7-1 is 0.3 $m^3$.

The side material conveying pipe 7-2 is a movement channel for the filling material and is connected to the underside of the side material conveying trough 7-1 for further guiding the filling material to flow downward.

In some embodiments, the whole structure of the side material conveying pipe 7-2 is designed to be inclined, which ensures that the side material conveying trough 7-1 does not contact the refractory brick channel 4, and at the same time the filling material is conveyed from the outside to the inner cavity at the root of the flange.

In some embodiments, an angle and a length of the side material conveying pipe 7-2 are designed according to a dimension of the side material conveying trough 7-1 and an outer contour dimension of the channel refractory brick 4. The side material conveying pipe 7-2 may be provided as oblique multi-angle splicing pipes or multi-section pipes with oblique multi-curvature splicing arcs to ensure the smooth flow of the filling material.

In some embodiments, a cross-sectional shape of the side material conveying pipe 7-2 is rounded rectangular to ensure the dimensional consistency of the side material conveying pipe 7-2 and the side material conveying nozzle 7-3. A narrower width direction of the rounded rectangle is vertically oriented. When the side material conveying pipe 7-2 is inserted into a filling gap at the root of the flange, due to a narrow space of the filling gap, the side material conveying pipe 7-2 needs to be placed vertically, with a narrow edge of the rounded rectangle aligning with a narrow edge of the filling gap, which ensures that the side material conveying pipe 7-2 can smoothly enter the cavity at the root of the flange.

In some embodiments, a cross-sectional width of the side material conveying pipe 7-2 is 25 mm. A cross-sectional length and a cross-sectional area are designed according to a flow rate and mobility. For example, the cross-sectional length of the side material conveying pipe 7-2 is within a range of 50 mm to 70 mm.

In some embodiments, each of the side material conveying trough 7-1 and the side material conveying pipe 7-2 is welded with a connection lug, and the connection lugs welded on the outside of the side material conveying trough 7-1 and the side material conveying pipe 7-2 may be referred to as first connection lugs.

The side material conveying nozzle 7-3 is connected to an end of the side material conveying pipe 7-2 to guide the filling material further deeper into the inner cavity of the root of the flange.

The side material conveying nozzle 7-3 has the same structure as the side material conveying pipe 7-2, and may be provided as oblique multi-angle splicing pipes or multi-section pipes with oblique multi-curvature splicing arcs with a cross-sectional shape of rounded rectangular or elliptical. The cross-sectional shape of the side material conveying nozzle 7-3 is perpendicular to the flowing direction of the filling material.

In some embodiments, an outlet end of the side material conveying nozzle 7-3 has a diagonal slit shape or rectangular shape, facilitating a further flow of small amounts of filling material.

The side material conveying support frame 7-4 is a component for realizing a support function and is connected to the side material conveying trough 7-1.

In some embodiments, the side material conveying support frame 7-4 includes a side long leg portion and a side short leg portion, with the side long leg portion disposed away from the side material conveying nozzle 7-3 and the side short leg portion disposed close to the side material conveying nozzle 7-3. For example, the side short leg portion is provided outside the refractory brick channel 4 and close to the side material conveying nozzle 7-3, and the side long leg portion is provided outside the refractory brick channel 4 and away from the side material conveying nozzle 7-3.

In some embodiments, an upper portion of the side material conveying support frame 7-4 is connected to the first connection lugs through bolts, allowing for rotation around a connection point. That is, a span angle of the support frame may be adjusted, enabling the support frame to rotate and adjust the span angle.

In some embodiments, a bottom portion of the side material conveying support frame 7-4 is welded with side support feet 7-5 to realize anti-slip capability. For example, the side support feet are round or otherwise shaped.

In some embodiments of the present disclosure, the material conveying structure is designed with a specially shaped stainless steel material conveying pipe and a material conveying support frame with a simple fixing structure, allowing for the quick assembly of the material conveying trough. Additionally, the material conveying nozzle may directly extend into the filling gap, thereby providing the structural function for rapid material filling.

In some embodiments of the present disclosure, a filling manner of filling is realized using a single material conveying structure or three material conveying structures with a shared material trough for synchronized filling, which effectively improves the filling efficiency and avoids local filling blind spots.

In some embodiments of the present disclosure, the material conveying trough has the hopper structure with a large upper and a small lower part, and the inclined angle of the hopper structure is within a range of 75° to 80° so that the filling material may slide into the material conveying pipe, which can ensure the normal flow of the filling material without causing material piling. In addition, the inclined angle is less than 80°, which can avoid the dusting of the filling material.

In some embodiments of the present disclosure, the whole structure of the side material conveying pipe is designed overall to be inclined, which ensures that the side material conveying trough does not contact the refractory brick channel of a channel body, and at the same time, the filling material may be conveyed from the outside to the inner cavity at the root of the flange.

In some embodiments of the present disclosure, the cross-sectional shape of the material conveying pipe is designed as a rounded rectangle or elliptical, which guarantees the dimensional consistency of the material conveying pipe and the material conveying nozzle. A narrower width direction of the rounded rectangle is vertically oriented. When the side material conveying pipe 7-2 is inserted into the filling gap at the root of the flange, due to the narrow space, the side material conveying pipe 7-2 needs to be placed vertically, with a narrow edge of the rounded rectangle aligning with a narrow edge of the filling gap, which ensures that the side material conveying pipe 7-2 may smoothly enter the cavity at the root of the flange.

FIG. 5 is a schematic diagram illustrating an exemplary structure of a top material conveying trough according to some embodiments of the present disclosure.

The top material conveying structure 8 is configured to pour filling material into a cavity region between a flange and a refractory brick channel through the top opening 6 on the refractory brick channel 4.

As shown in FIG. 5, the top material conveying structure 8 is similar to the side material conveying structure 7. The top material conveying structure 8 includes a top material conveying trough 8-1, a top material conveying pipe 8-2, a top material conveying nozzle 8-3, and a top material conveying support frame 8-4. A shape of the top material conveying structure 8 is designed in accordance with a principle of the side material conveying structure 7, and functions of components of the top material conveying structure 8 are similar to those of the side material conveying structure 7.

In some embodiments, the top material conveying structure 8 includes the top material conveying trough 8-1, the top material conveying pipe 8-2, the top material conveying nozzle 8-3, and the top material conveying support frame 8-4. The top material conveying trough 8-1 has a hopper structure with a large top and a small bottom, and each of the top material conveying trough 8-1 and the top material conveying pipe 8-2 is welded with a connection lug. The top material conveying support frame 8-4 includes a top long leg portion and a top short leg portion. The top short leg portion is provided outside the refractory brick channel 4 and close to the top material conveying nozzle, and the top long leg portion is provided outside the refractory brick channel 4 and away from the top material conveying nozzle. An upper portion of the top material conveying support frame 8-4 is connected to the connection lugs through bolts, and a bottom portion of the top material conveying support frame 8-4 is welded with top support feet (not shown in the figures).

In some embodiments, the connection lugs welded on the top material conveying trough 8-1 and the top material conveying pipe 8-2 are referred to as second connection lugs.

In some embodiments, the top support feet are circular. The top material conveying pipe 8-2 and the top material conveying nozzle 8-3 are provided as straight pipes or segmented multi-angle splicing pipes, cross-sectional shapes of the top material conveying pipe 8-2 and the top material conveying nozzle 8-3 both are rounded rectangular or elliptical. An outlet end of the top material conveying nozzle 8-3 has a diagonal slit shape or rectangular shape.

In some embodiments, a volume of the top material conveying trough 8-1 is larger than a volume of the side material conveying trough 7-1 since the top material conveying trough 8-1 serves as a main filling channel of a material conveying structure. For example, the volume of the top material conveying trough 8-1 is 0.6 m$^3$.

In some embodiments, a cross-sectional width of the top material conveying pipe 8-2 is equal to a cross-sectional width of the side material conveying pipe 7-2. For example, the cross-sectional width of the top material conveying pipe 8-2 is 25 mm.

In some embodiments, a cross-sectional length of the top material conveying pipe 8-2 is greater than a cross-sectional length of the side material conveying pipe 7-2. For example, the cross-sectional length of the top material conveying pipe 8-2 is within a range of 65 mm to 85 mm.

In some embodiments, an inclined angle of the top material conveying pipe 8-2 is less than an inclined angle of the side material conveying pipe 7-2, in order to avoid dust generation caused by the high drop at the top. For example, the inclined angle of the top material conveying pipe 8-2 is 75°.

In some embodiments, the top material conveying pipe 8-2 is provided as straight pipes or segmented multi-angle splicing pipes. For example, a splice angle between two adjacent segmented multi-angle splicing pipes is 75°.

In some embodiments of the present disclosure, the cross-sectional shape of the top material conveying pipe is designed as rounded rectangular or elliptical, which guarantees the dimensional consistency of the material conveying pipe and the material conveying nozzle. A narrower width direction of the rounded rectangle is vertically oriented such that the material conveying pipe can smoothly enter the cavity region at the root of the flange.

In some embodiments of the present disclosure, the outlet end of the top material conveying nozzle 8-3 is designed to be a diagonal slit shape or rectangular shape, which facilitates further flowing of a small amount of filling material.

In some embodiments of the present disclosure, an upper portion of the top material conveying support frame 8-4 is connected to connection lugs welded on the top material conveying trough 8-1 and the top material conveying pipe 8-2 through bolts, allowing for rotation around a connection point. That is, a span angle of the support frame may be adjusted, enabling the support frame to rotate and adjust the span angle.

In some embodiments of the present disclosure, circular support feet are welded on the bottom portion of the top material conveying support frame 8-4, and the support feet has a larger contact surface with the ground or a top portion of the refractory brick channel 4, achieving anti-slip capability.

Some embodiments of the present disclosure provide a hot-state efficient filling method for a root of a flange of a clarification section of a platinum channel, which can be realized based on a hot-state efficient filling device for a root of a flange of a clarification section of a platinum channel, comprising following operations: temporarily sealing a cavity region between the flange and a refractory brick channel with a high-temperature cotton in a heating process, and when expansion of the clarification section of the platinum channel reaches an expected level, removing the cotton in the cavity region, inserting a material conveying structure through one or more filling observation openings into the root of the flange of the clarification section of the platinum channel, and setting a reserved distance between an output end of a material conveying structure and a platinum body; and pouring a filling material into an input end of the material conveying structure such that the filling material flows through the material conveying structure into the root of the flange of the clarification section of the platinum channel, while observing a filling situation of the filling material through the one or more filling observation openings to complete a hot-state efficient filling of the root of the flange of the clarification section of the platinum channel.

While implementing the method, the hot-state efficient filling device for a root of a flange of a clarification section of a platinum channel may be installed in advance. During a process in which the platinum body reaches 1300° C., the high-temperature cotton is used for temporary sealing of the cavity region, which provides a certain degree of thermal insulation without affecting the expansion of the platinum, so as to maintain a temperature difference within the cavity of the platinum body below 100° C. Once the platinum body reaches 1300° C. and it is confirmed that the expansion of platinum reaches a preset value, the cavity region is then filled according to a following manner.

(1) The three material conveying structures shall be debugged and assembled in advance, and after the high-temperature cotton in the cavity at the root of the flange is removed, the three material conveying devices are moved and inserted into the root of the flange, and a distance between the material conveying nozzle of the material conveying structure and the platinum body 1 is controlled within a preset range. For example, the preset range is within a range of 30 mm to 40 mm, so as to ensure normal outflow of the filling material from an end of the material conveying nozzle of the material conveying structure to sufficiently fill the root of the flange of the platinum channel.

(2) An operator shall tighten bolts that connect the material conveying support frame and each of the three material conveying structures to ensure the stability of the material conveying structure.

Assign one person to stand above a main body of the channel and another to convey the filling material. Once skilled, two individuals may be assigned to perform a loading operation simultaneously. Instead of gradually loading in small batches, the entire container of filling material may be poured directly such that the filling material may automatically flow into the root of the flange.

Assign another person to observe an alignment situation of the filling material at the lower side opening 5. A stainless steel brazing bar is used to poke the filling material to clear any blockages, at the outlet end of the lower material conveying nozzle.

The entire process requires 2 people for loading, 2 people for conveying the filling material, and 1 person for poking to clear blockages. A root of a flange may be filled within 10 minutes, which is 70% faster compared to the traditional manner of manually holding the filling material container and repeatedly shoveling the filling material with an iron scoop.

In some embodiments of the present disclosure, the high-temperature cotton is used for temporary scaling of the cavity region in the heating process, which provides a certain degree of thermal insulation without affecting the expansion of the platinum, so as to keep a temperature difference within the cavity region of the platinum below 100° C.

In some embodiments of the present disclosure, the entire batch of filling material is poured into the material conveying structure at once, allowing the filling material to automatically enter the root of the flange, which optimizes a conventional manner of gradually introducing the filling material in small batches during a filling process.

After practical application, the hot-state efficient filling method for a root of a flange of a clarification section of a platinum channel results in a 70% reduction in an exposure time of the root of the flange, which means that the time during which the platinum at the root of the flange is affected by the impact of the external environment is reduced by 70%. Additionally, after a filling process is completed, based on craft feedback, a temperature difference before and after a filling process is reduced by 70° C., which is an improvement of 20° C. compared to the traditional 50° C. The hot-state efficient filling method in some embodiments of the present disclosure significantly enhances the scaling and insulation effects at the root of the flange of the clarification section.

With the hot-state efficient filling method for a root of a flange of a clarification section of a platinum channel provided in some embodiments of the present disclosure, a rapid filling of the clarification section of the platinum channel may be accomplished with only a small amount of manpower and the impact on the root of the flange from the environment is reduced. In some embodiments, the filling process may be automated using a loading device, which enables the filling process to be more efficient and convenient.

In some embodiments, the hot-state efficient filling device for a root of a flange of a clarification section of a platinum channel further includes a loading device 9.

Figure 6:
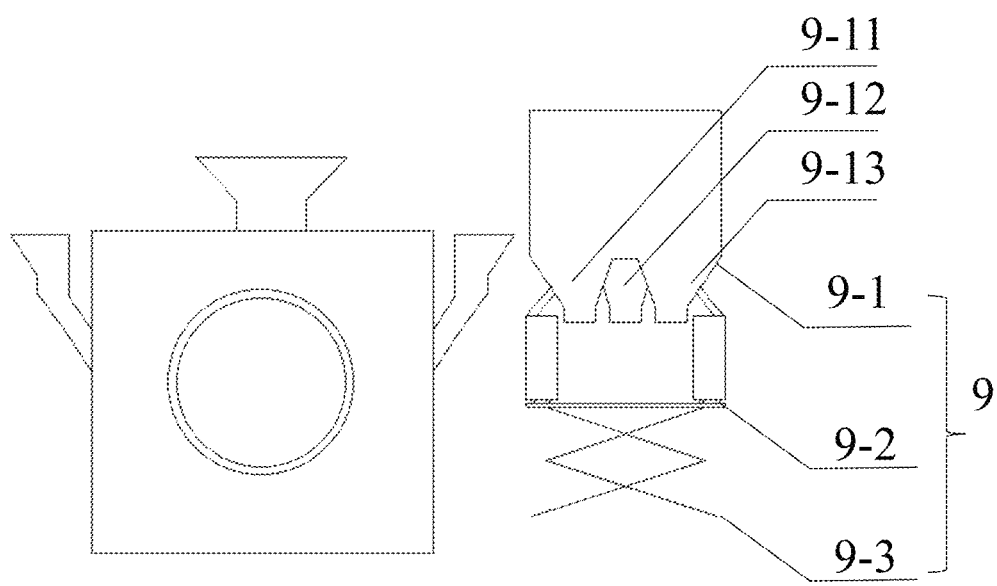
FIG. 6 is a schematic diagram illustrating an exemplary structure of a loading device according to some embodiments of the present disclosure.

FIG. 6 is a schematic diagram illustrating an exemplary structure of a loading device according to some embodiments of the present disclosure.

The loading device is a device configured to add a filling material to a material conveying structure. In some embodiments, the loading device 9 includes a material bin 9-1, a moving track 9-2, and a lifting table 9-3.

The material bin 9-1 is a container configured to store the filling material. In some embodiments, the material bin 9-1 is movably disposed on the moving track 9-2.

In some embodiments, the material bin 9-1 includes a material bin body, a discharge port, and a support seat. The material bin body may be configured to store the filling material, the discharge port is provided below the material bin body, and the discharge port may be configured to output the filling material. The material bin body may be fixed above the support seat, and the support seat may be slidingly connected to the moving track to realize movement of the material bin.

In some embodiments, the discharge port includes a first discharge port 9-11, a second discharge port 9-12, and a third discharge port 9-13. In some embodiments, each discharge port is connected to a corresponding material conveying trough of the material conveying structure via a deformable and corrosion-resistant pipe, respectively. For example, the pipe is a stainless steel corrugated pipe.

In some embodiments, the first discharge port 9-11 and the third discharge port 9-13 are connected to the two side material conveying troughs 7-1, respectively, and the second discharge port 9-12 is connected to the top material conveying trough 8-1.

In some embodiments, the material conveying structure may not include a material conveying trough, and the material conveying pipe is directly connected to the discharge port through a material outlet pipe.

In some embodiments, the discharge port is provided with a valve. The valve may control the opening and closing of the discharge port and an opening degree of the discharge port.

In some embodiments, the discharge port is provided with a master valve to control three discharge ports simultaneously.

In some embodiments, each discharge port is individually provided with a valve to control an opening degree of each discharge port.

The moving track 9-2 is a track configured to guide horizontal movement of the material bin 9-1. For example, during a filling process, the discharge port of the material bin needs to be aligned with the material conveying trough of the material conveying structure. The material bin may be moved using the moving track, eliminating the need for manual handling of the material bin. The moving track 9-2 may be provided on the lifting table 9-3.

The lifting table 9-3 is a device configured to control a height of the material bin 9-1. In some embodiments, the lifting table 9-3 is an electric lifting table, a hydraulic lifting table, a pneumatic lifting table, or other structures that enable lifting.

In some embodiments, the loading device further includes a pressing device, the pressing device may be disposed within the material bin for continuously pressing the filling material.

In some embodiments, the pressing device includes a cylinder and a pressing plate, and the pressing plate may be a stainless steel plate. In some embodiments, the pressing device is disposed on a top portion of the material bin, and after the discharge port is opened, the pressing plate is driven by the cylinder to continually press the filling material to enable the filling material to rapidly enter the cavity region.

In some embodiments of the present disclosure, the filling material is conveyed to an input end of the material conveying structure by the loading device to perform a loading operation, which allows for automated filling of the cavity region at the root of the flange, thereby reducing the labor cost and improves the filling efficiency and filling effect.

In some embodiments, the hot-state efficient filling device for a root of a flange of a clarification section of a platinum channel further comprises a driving device and a poking bar.

The driving device is connected to the poking bar for driving the poking bar to perform automatic poking at the side opening 5 during the filling process, so as to allow the filling material to enter the cavity region quickly.

The poking bar is configured to press the filling material in the cavity region firmly. In some embodiments, there are two poking bars, which are located at openings on each side of the refractory brick channel 4, and the two poking bars are inserted from the outside of the refractory brick channel 4 into the cavity region through the side openings 5, respectively. In some embodiments, the poking bars are removed from the side openings 5 after a loading operation is completed.

In some embodiments, the poking bar is a stainless steel brazing bar. A head of the poking bar may be provided with a compression block, and the compression block may increase a contact area between the poking bar and the filling material to achieve fast poking.

In some embodiments, the hot-state efficient filling device for a root of a flange of a clarification section of a platinum channel further comprises a communication module. The communication module may be provided on the filling device or provided independently.

In some embodiments, the communication module is configured to receive parameters sent down by a processor in a remote server for controlling the loading device and the driving device to work in accordance with the parameters. More content about determining the parameters can be found in FIG. 7 and FIG. 8 and the related descriptions thereof.

Figure 7:
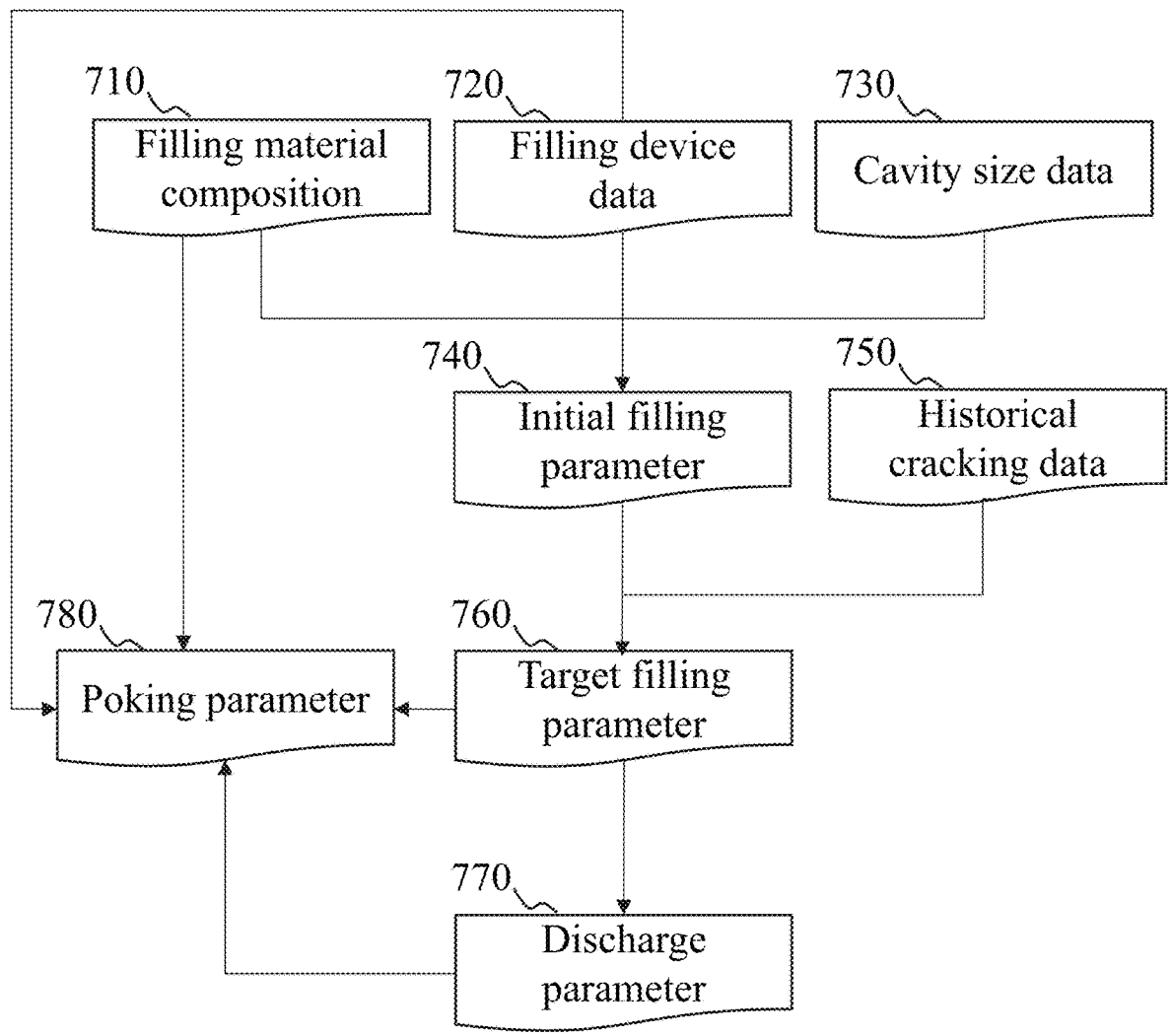
FIG. 7 is a schematic diagram illustrating a process for determining a discharge parameter and a poking parameter according to some embodiments of the present disclosure.

FIG. 7 is a schematic diagram illustrating a process for determining a discharge parameter and a poking parameter according to some embodiments of the present disclosure.

In some embodiments, a processor obtains the discharge parameters via a communication module and causes a loading device to pour a filling material into an input end of a material conveying structure based on the discharge parameters.

The discharge parameter is a parameter used to control opening of a valve corresponding to a discharge port. In some embodiments, the discharge parameters include an opening period and an opening degree of the valve corresponding to the discharge port.

In some embodiments, the discharge parameters include a first discharge parameter, a second discharge parameter, and a third discharge parameter, corresponding to a first discharge port, a second discharge port, and a third discharge port, respectively.

The opening period is a time period during which the valve of the discharge port remains open, which may be set by a person skilled in the art based on experience. For example, the opening period of the first discharge port is denoted as (T1, T2), with T1 and T2 denoting a start time and an end time of opening the valve, respectively.

In some embodiments, the opening degree refers to the extent to which the valve is opened. The opening degree may be expressed as a percentage from 0% to 100%.

In some embodiments, the discharge parameters are represented as a vector including an opening period and an opening degree of at least one discharge port. For example, the discharge parameters are represented as $\{(M_1, N_1), (M_2, N_2), (M_3, N_3)\}$, wherein $M_1, M_2, M_3$ denote opening periods of valves corresponding to the first discharge port, the second discharge port, and the third discharge port, respectively, and $N_1, N_2, N_3$ denote opening degrees of the valves corresponding to the first discharge port, the second discharge port, and the third discharge port, respectively.

In some embodiments, a discharge parameter 770 is determined by the processor in the remote server and sent by the processor to the loading device via the communication module to cause the loading device to input the filling material into the material conveying trough of the material conveying structure in accordance with the discharge parameter.

In some embodiments, the processor determines an initial filling parameter 740 based on a filling material composition 710, a filling device data 720, and cavity size data 730; determine a target filling parameter 760 based on historical cracking data 750 and the initial filling parameter 740; and determines the discharge parameter 770 based on the target filling parameter 760.

The filling material composition refers to granularity information of the filling material. The filling material composition may, for example, include at least one of a particle size and a particle density of the filling material.

In some embodiments, the filling material composition is determined based on manual input or product information of the filling material.

The cavity size data is dimensional data of a cavity region between a flange and a refractory brick channel. For example, the cavity region is a cylinder, and the cavity size data may include a radius of the cavity region and a radius of a platinum channel.

In some embodiments, the cavity size data 730 is obtained by manual measurements of the cavity region.

The filling device data 720 refers to dimensional data corresponding to a device associated with a filling process. In some embodiments, the filling device data 720 includes a dimension of a filling observation opening, a dimension of a material conveying pipe, etc. For example, when the filling observation opening is rectangular, the dimension includes a length and width of the filling observation opening, and when the filling observation opening is circular, the dimension may include a radius of the filling observation opening. The dimension of the material conveying pipe may include a length and radius of the material conveying pipe. In some embodiments, the filling device data 720 is determined based on manual input.

The initial filling parameter 740 refers to values of various parameters that are configured to set a starting operation state of the device prior to a filling task or a filling process. In some embodiments, the initial filling parameter 740 includes a total amount of filling material and a filling rate corresponding to at least one discharge port.

In some embodiments, the processor determines the initial filling parameter 740 by querying a filling parameter reference table. The filling parameter reference table may include a correspondence between a reference filling material composition, a reference cavity size data, a reference filling device data, and a reference initial filling parameter. The filling parameter reference table may be set by a person skilled in the art based on experience.

The historical cracking data 750 refers to a historical flange material, a historical flange dimension, and a historical filling parameter in the filling process when a root of a flange cracks in a plurality of sets of historical data.

The target filling parameter 760 refers to a parameter value that is expected to be achieved or optimized to reach a desired filling state or performance level during a filling task or a filling process. In some embodiments, the target filling parameter 760 includes a target total amount of filling material and a target filling rate corresponding to at least one discharge port.

In some embodiments, the processor constructs a first vector based on a current flange material and a current flange dimension, designates the initial filling parameter as a label of the first vector, and constructs a plurality of second vectors based on at least one set of historical cracking data. The historical flange material and the historical flange dimension in the historical cracking data are elements in the second vector, and the historical filling parameter is a label of the second vector. The processor may cluster the first vector and the second vector based on the flange material and the flange dimension to obtain at least one cluster, and designate a cluster where the first vector is located as a first target cluster.

In some embodiments, the processor determines a reference value of a filling parameter based on at least one second vector corresponding to the first target cluster. For example, the processor determines the reference value based on a mean value of labels corresponding to the at least one second vector.

In some embodiments, in response to determining that a difference between the initial filling parameter and the reference value does not exceed a preset threshold, the initial filling parameter 740 is adjusted and an adjusted initial filling parameter 740 is designated as the target filling parameter 760. In response to determining that the difference between the initial filling parameter and the reference value exceeds the preset threshold, the initial filling parameter 740 is designated as the target filling parameter 760.

In some embodiments, adjusting the initial filling parameter 740 includes adjusting the initial filling parameter 740 until a difference between the initial filling parameter 740 and the reference value exceeds a preset threshold.

In some embodiments, the difference between the initial filling parameter 740 and the reference value includes a difference in a total amount of filling material and a difference in a filling rate. Not exceeding the preset threshold refers to that the difference in a total amount of filling material does not exceed a total amount of filling material threshold and the difference in a filling rate does not exceed a filling rate threshold.

In some embodiments, the preset threshold includes the total amount of filling material threshold and the filling rate threshold. The preset threshold may be set by a person skilled in the art based on experience.

In some embodiments, the preset threshold is determined based on historical intact data and historical cracking data. The historical intact data refers to a historical flange material, a historical flange dimension, and a historical filling parameter in the filling process when the root of the flange does not crack in a plurality of sets of historical data.

For example, the processor constructs a plurality of third vectors based on at least one set of historical intact data, wherein historical flange materials and historical flange dimensions in the historical intact data are elements in the third vector, and a historical filling parameter in the historical intact data is a label of the third vector. The processor further cluster the first vector and the third vector based on the flange material and the flange dimension to obtain at least one cluster, and designate a cluster where the first vector is located as a second target cluster. A detailed description of the first vector can be found in the aforementioned related description.

In some embodiments, the processor designates a difference between a mean value of labels corresponding to the at least one third vector in the second target cluster and the reference value as a preset threshold.

In some embodiments, the processor further determines a reference parameter range based on a label corresponding to at least one third vector in the second target cluster. In response to determining that the initial filling parameter is not within the reference parameter range, the processor may adjust the initial filling parameter to be within the reference parameter range, and designate an adjusted initial filling parameter as the target filling parameter. In response to determining that the initial filling parameter is within the reference parameter range, the processor may designate the initial filling parameter as the target filling parameter.

In some embodiments, the processor determines the discharge parameter by cluster analysis. In some embodiments, an object to be clustered for the cluster analysis includes a plurality of clustering vectors and a plurality of target vectors.

In some embodiments, the clustering vector is constructed based on historical data, wherein the historical data includes the historical filling material composition, the historical cavity size data, the historical filling device data, and the historical target filling parameter. A historical discharge parameter actually used during a filling process in the historical data is designated as a label of the clustering vector.

In some embodiments, the target vector is constructed based on a current filling material composition, a current filling device data, a current cavity size data, and a target filling parameter.

In some embodiments, cluster metrics for the cluster analysis include the filling material composition, the cavity size data, the filling device data, and the target filling parameter.

In some embodiments, the processor clusters the object to be clustered based on the clustering metrics to obtain a plurality of clustering clusters, selects a target clustering cluster that contains the target vector from the plurality of clustering clusters, and determines the discharge parameter based on a historical discharge parameter corresponding to at least one clustering vector in the target clustering cluster. For example, at least one opening period of historical discharge parameters corresponding to at least one clustering vector is obtained, the union of the at least one opening period is obtained, and an opening period corresponding to the union is designated as a target opening period. At least one opening degree of the historical discharge parameters corresponding to at least one clustering vector is obtained, a mean value of the at least one opening degree is determined, and the mean value is designated as a target opening degree. Further, the target opening period and the mean value of the at least one opening degree are designated as discharge parameters corresponding to the target vector.

In some embodiments, the processor further determines the discharge parameters using a prediction model. Related content of determining the discharge parameter based on the prediction model can be found in the detailed description of FIG. 8.

In some embodiments, the processor also obtains the poking parameter through the communication module, so as to cause the driving device to drive the poking bar based on the poking parameter to automatically poke the filling material in the cavity region.

The poking parameter is a parameter set for automatic poking of the filling material in the cavity region by the poking bar. In some embodiments, the poking parameter includes a poking frequency, a poking depth, and a poking speed. The poking frequency is a frequency at which the poking bar performs the poking. The poking depth is a depth at which the compression block moves forward when poking. The poking speed is a speed at which the compression block moves forward.

In some embodiments, the poking parameter is determined by the processor in the remote server and sent by the processor to the driving device through the communication module, so as to cause the driving device to poke the filling material in the cavity region based on the poking parameter.

In some embodiments, the processor determines a poking parameter 780 based on the target filling parameter 760, the discharge parameter 770, the filling material composition 710, and the filling device data 720.

For example, the processor constructs a feature vector based on the current target filling parameter, the current discharge parameter, the current filling material composition, and the current filling device data. Further, the processor may query a vector database to determine the poking parameter based on the feature vector.

In some embodiments, the vector database includes reference vectors and labels corresponding to the reference vectors. The reference vector may be constructed based on a historical target filling parameter, a historical discharge parameter, a historical filling material composition, and historical filling device data corresponding to a filling process with the best poking effect in the historical data. The label corresponding to the reference vector may be a historical poking parameter corresponding to the filling process with the best poking effect.

In some embodiments, the best poking effect refers to that the densification of the filling material in the cavity region after the filling process is the highest, and the amount of the filling material brought out during a poking process is the least. Detailed descriptions of the poking effect and determining the poking effect can be found in the related description in FIG. 8.

In some embodiments, the processor determines a reference vector that has the highest similarity degree to the feature vector and designates a label of the reference vector as a poking parameter corresponding to the target vector. The similarity degree may be determined based on a distance between the feature vector and the reference vector, and the smaller the distance, the higher the similarity degree.

In some embodiments, the processor further determines the poking parameter using a prediction model. More descriptions regarding determining the poking parameter based on the prediction model can be found in FIG. 8.

Figure 8:
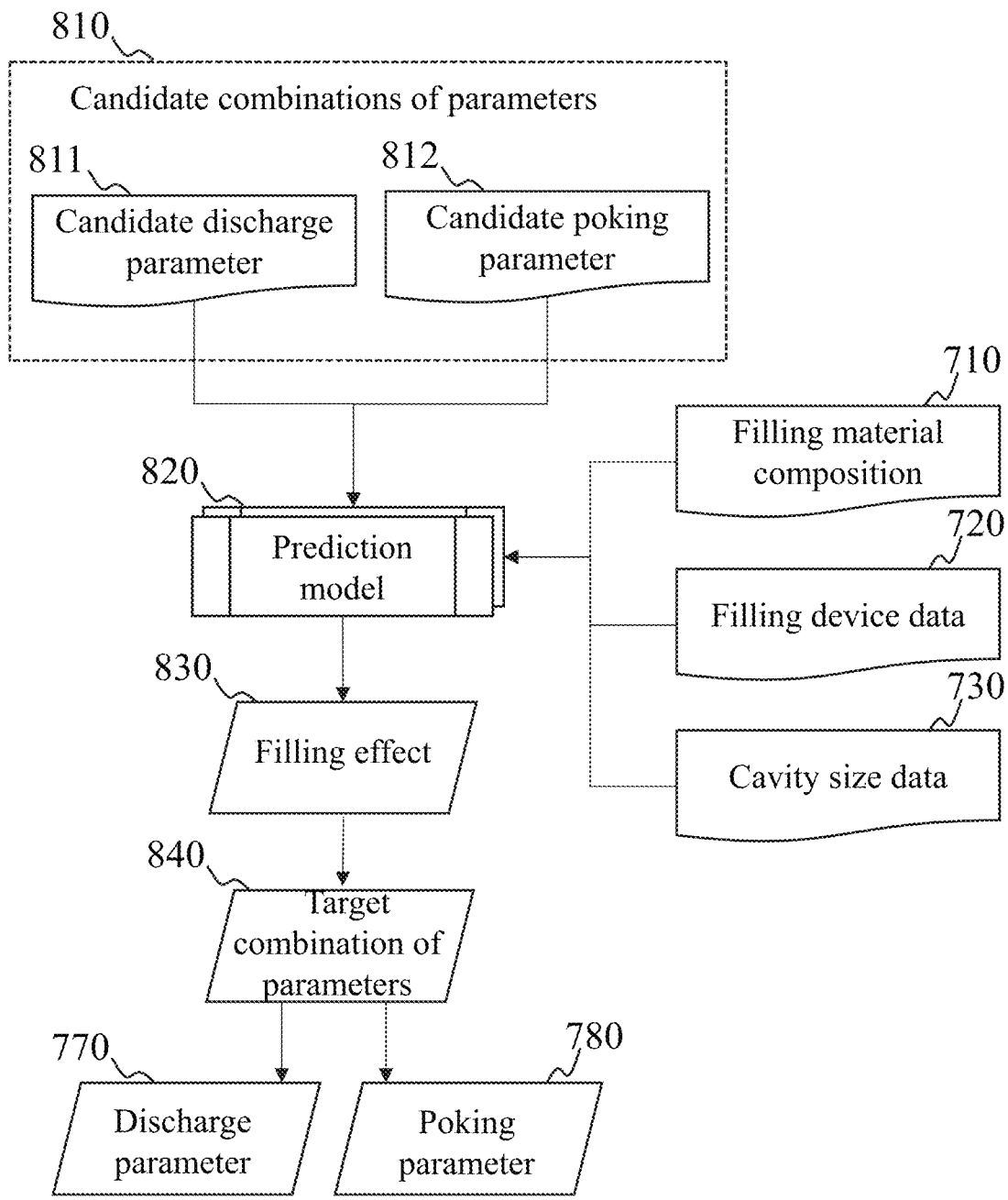
FIG. 8 is a schematic diagram illustrating a prediction model according to some embodiments of the present disclosure.

FIG. 8 is a schematic diagram illustrating a prediction model according to some embodiments of the present disclosure.

In some embodiments, a processor generates a plurality of candidate combinations of parameters 810 based on a target filling parameter. For one of the plurality of candidate combinations of parameters 810, the processor predicts a filling effect 830 based on the candidate combination of parameters 810, the filling material composition 710, the filling device data 720, and the cavity size data 730 using a prediction model 820. Further, the processor determines a target combination of parameters 840 based on a plurality of filling effects 830 corresponding to the plurality of candidate combinations of parameters 810, and determines the discharge parameter 770 and the poking parameter 780 based on the target combination of parameters 840.

In some embodiments, the candidate combination of parameters 810 includes at least one of a candidate discharge parameter 811 and a candidate poking parameter 812.

In some embodiments, the processor randomly generates the plurality of candidate combinations of parameters 810, provided that a total filling amount and a filling speed in the target filling parameter are satisfied.

The prediction model 820 may be a machine learning model, for example, a neural network model or other machine learning models obtained by training.

In some embodiments, inputs to the prediction model 820 include the candidate combination of parameters 810, the filling material component 710, the filling device data 720, and the cavity size data 730, and an output of the prediction model 820 includes the filling effect 830 corresponding to the candidate combination of parameters 810.

The filling effect is a parameter used to evaluate a filling result of the cavity region.

In some embodiments, the filling effect 830 includes a filling time and a densification of the cavity region after the filling is completed.

The densification refers to a tightness of the filling material within the cavity region. In some embodiments, the densification is determined by a ratio of a difference between a total filling weight of the filling material and a residual weight of the filling material to a volume of the cavity region. The residual weight may be determined based on a weight of the filling material remaining in a material conveying pipe, on a stainless steel braze, on a compression block, or other structures.

In some embodiments, the prediction model 820 is obtained by training a plurality of training samples with labels.

In some embodiments, the training sample includes a historical poking parameter, a historical discharge parameter, a historical filling material composition, a historical cavity size data, and a historical filling device data in historical data.

The label includes an actual filling time of a filling material corresponding to a training sample in historical data, as well as an actual densification of a cavity region after a filling is completed. The actual filling time may be obtained by monitoring a historical filling process. The actual densification may be determined based on a total filling weight of filling material, a residual weight of filling material, and a volume of a cavity region after the historical filling process is completed. More content can be found in the aforementioned descriptions.

In some embodiments, the processor inputs the training samples into an initial prediction model to perform an iteration process including a plurality of iterations. When an end-of-iteration condition is satisfied, the iteration process is finished, and a trained prediction model is obtained. One iteration may include: inputting one or more training samples into an initial model, and obtaining one or more outputs corresponding to the one or more training samples output by the initial model. A value of a loss function is obtained by introducing the one or more outputs corresponding to the one or more training samples output by the model, and labels of the one or more training samples into an equation of a preset loss function. Based on the value of the loss function, model parameters of the initial model are updated in reverse, which may be performed using various manners. For example, the model parameters are updated based on a gradient descent algorithm.

In some embodiments, the processor determines the target combination of parameters based on the filling effect of the candidate combinations of parameters. For example, each candidate combination of parameters is evaluated based on a weighted sum of filling time and a densification in a filling effect, and a candidate combination of parameters with the largest weighted sum is designated as the target combination of parameters 840.

In some embodiments, the weight factors for determining the weighted sum is set by a person skilled in the art based on experience. A weight factor corresponding to the filling time is a value less than 0, and a weight factor corresponding to the densification is a value greater than 0.

In some embodiments, the weight factor corresponding to the densification is correlated to an ambient temperature around a platinum channel, e.g., the higher the ambient temperature, the greater the weight factor corresponding to the densification.

In some embodiments of the present disclosure, relevant parameters of the filling device and the root of the flange, etc., are obtained by the processor. The processor then automatically generates the discharge parameter and the poking parameter to control the filling process and the poking operation to enable automatic filling, which achieves efficient and precise filling without the need for manual intervention, thereby reducing the filling costs.

Finally, it should be noted that the above embodiments are only used to illustrate the technical solutions of the present disclosure rather than to limit the scope of its protection and that although the present disclosure has been described in detail with reference to the above embodiments, the person of ordinary skill in the field should understand that: after reading the present invention, the person of skill in the field can still make various changes, modifications or equivalent replacements to the specific embodiments of the present disclosure, but these changes or equivalent replacements are within the scope of protection of the pending claims.

What is claimed is:

1. A hot-state efficient filling device for a root of a flange of a clarification section of a platinum channel, comprising a material conveying structure, wherein
a refractory brick channel is provided outside the clarification section of the platinum channel,
the clarification section of the platinum channel includes a platinum body and the flange, a cavity region is provided between the flange and the refractory brick channel and used for normal expansion of the flange in a heating process,
a filling observation opening is formed on the refractory brick channel corresponding to the cavity region, a transmission end of the flange penetrates through the filling observation opening, the material conveying structure penetrates through the filling observation opening, and
an output end of the material conveying structure is provided in the cavity region, an input end of the material conveying structure is provided outside the refractory brick channel, and a reserved distance is arranged between the output end of the material conveying structure and the platinum body.

2. The hot-state efficient filling device of claim 1, wherein the material conveying structure includes two side material conveying structures, and the two side material conveying structures are symmetrically provided on two sides of the platinum channel.

3. The hot-state efficient filling device of claim 2, wherein each of the two side material conveying structures includes a side material conveying trough, a side material conveying pipe, a side material conveying nozzle, and a side material conveying support frame;
the side material conveying trough has a hopper structure with a large top and a small bottom, an inclined angle of the hopper structure is within a range of 75° to 80°,
each of an outside of the side material conveying trough and an outside of the side material conveying pipe is welded with a connection lug,
the side material conveying support frame includes a side long leg portion and a side short leg portion, the side short leg portion is provided outside the refractory brick channel and close to the side material conveying nozzle, and the side long leg portion is provided outside the refractory brick channel and away from the side material conveying nozzle, and
an upper portion of the side material conveying support frame is connected to the connection lugs through bolts, and a bottom portion of the side material conveying support frame is welded with side support feet.

4. The hot-state efficient filling device of claim 3, wherein the side support feet are circular,
the side material conveying pipe and the side material conveying nozzle are provided as oblique multi-angle splicing pipes or multi-section pipes with oblique multi-curvature splicing arcs, cross-sectional shapes of the side material conveying pipe and the side material conveying nozzle both are rounded rectangular or elliptical, the cross-sectional shapes are perpendicular to a flowing direction of a filling material, and
an outlet end of the side material conveying nozzle has a diagonal slit shape or rectangular shape.

5. The hot-state efficient filling device of claim 2, wherein the conveying structure further includes a top material conveying structure,
the filling observation opening includes two side openings and a top opening, the two side material conveying structures penetrate through the two side openings, respectively, the top material conveying structure penetrates through the top opening, and the transmission end of the flange penetrates through the top opening.

6. The hot-state efficient filling device of claim 5, wherein the top material conveying structure includes a top material conveying trough, a top material conveying pipe, a top material conveying nozzle, and a top material conveying support frame,
the top material conveying trough has a hopper structure with a large top and a small bottom,
each of the top material conveying trough and the top material conveying pipe is welded with a connection lug,
the top material conveying support frame includes a top long leg portion and a top short leg portion, the top short leg portion is provided outside the refractory brick channel and close to the top material conveying nozzle, and the top long leg portion is provided outside the refractory brick channel and away from the top material conveying nozzle, and
an upper portion of the top material conveying support frame is connected to the connection lugs through bolts, and a bottom portion of the top material conveying support frame is welded with top support feet.

7. The hot-state efficient filling device of claim 6, wherein the top support feet are circular,
the top material conveying pipe and the top material conveying nozzle are provided as straight pipes or segmented multi-angle splicing pipes, cross-sectional shapes of the top material conveying pipe and the top material conveying nozzle both are rounded rectangular or elliptical, the cross-sectional shapes are perpendicular to a flowing direction of a filling material, and
an outlet end of the top material conveying nozzle has a diagonal slit shape or rectangular shape.

8. The hot-state efficient filling device of claim 3, wherein
a cross-sectional width of the top material conveying pipe is equal to a cross-sectional width of the side material conveying pipe,
a cross-sectional length of the top material conveying pipe is greater than a cross-sectional length of the side material conveying pipe, an inclined angle of the top material conveying pipe is greater than an inclined angle of the side material conveying pipe, and a volume of the top material conveying trough is greater than a volume of the side material conveying trough.

9. The hot-state efficient filling device of claim 1, wherein a filling layer is provided between the platinum body and the refractory brick channel, the conveying structure is made of stainless steel, and the stainless steel has a carbon content of less than 0.08%.

10. A hot-state efficient filling method for a root of a flange of a clarification section of a platinum channel, utilizing the hot-state efficient filling device of claim 1, comprising:

temporarily sealing the cavity region between the flange and the refractory brick channel with a high-temperature cotton in the heating process, and when expansion of the clarification section of the platinum channel reaches an expected level, removing the cotton in the cavity region, inserting the material conveying structure through the filling observation opening into the root of the flange of the clarification section of the platinum channel, and setting the reserved distance between the output end of the material conveying structure and the platinum body; and pouring a filling material into the input end of the material conveying structure such that the filling material flows through the material conveying structure into the root of the flange of the clarification section of the platinum channel, while observing a filling situation of the filling material through the filling observation opening to complete a hot-state efficient filling of the root of the flange of the clarification section of the platinum channel.

* * * * *